US011797889B1

(12) United States Patent
Ahn et al.

(10) Patent No.: US 11,797,889 B1
(45) Date of Patent: Oct. 24, 2023

(54) METHOD AND DEVICE FOR MODELING A BEHAVIOR WITH SYNTHETIC TRAINING DATA

(71) Applicant: Apple Inc., Cupertino, CA (US)

(72) Inventors: Edward S. Ahn, Mountain View, CA (US); Siva Chandra Mouli Sivapurapu, Santa Clara, CA (US); Mark Drummond, Palo Alto, CA (US); Aashi Manglik, Sunnyvale, CA (US); Shaun Budhram, San Jose, CA (US); Behrooz Mahasseni, San Jose, CA (US)

(73) Assignee: APPLE INC., Cupertino, CA (US)

( * ) Notice: Subject to any disclaimer, the term of this patent is extended or adjusted under 35 U.S.C. 154(b) by 132 days.

(21) Appl. No.: 17/557,288

(22) Filed: Dec. 21, 2021

Related U.S. Application Data

(60) Provisional application No. 63/139,898, filed on Jan. 21, 2021.

(51) Int. Cl.
*G06N 20/00* (2019.01)
*G06T 17/00* (2006.01)

(52) U.S. Cl.
CPC ............. *G06N 20/00* (2019.01); *G06T 17/00* (2013.01)

(58) Field of Classification Search
CPC ....... G06T 13/00; G06T 13/20; G06T 13/205; G06T 13/40; G06T 13/60; G06T 13/80;
(Continued)

(56) References Cited

U.S. PATENT DOCUMENTS

2019/0228495 A1 7/2019 Tremblay et al.
2019/0314984 A1 10/2019 Gonzalez Aguirre et al.
(Continued)

FOREIGN PATENT DOCUMENTS

CN 101887489 A * 11/2010
JP 2019098949 A * 6/2019

OTHER PUBLICATIONS

Judith Butepage et al., "Imitating by Generating: Deep Generative Models for Imitation of Interactive Tasks," Frontiers in Robotics and AI 7 (2020): 47, pp. 1-17.
(Continued)

*Primary Examiner* — Jeffery A Brier
(74) *Attorney, Agent, or Firm* — Fernando & Partners, LLP

(57) ABSTRACT

In one implementation, a method for modeling a behavior with synthetic training data. The method includes: obtaining source content that includes an entity performing one or more actions within an environment; generating a first environment characterization vector characterizing the environment; generating a first set of behavioral trajectories associated with the one or more actions of the entity based on the source content and the first characterization vector for the environment; generating a second environment characterization vector for the environment by perturbing the first environment characterization vector; generating a second set of behavioral trajectories associated with one or more potential actions of the entity based on the source content and the second characterization vector for the environment; and training a behavior model for a virtual agent based on the first and second sets of behavioral trajectories in order to imitate the entity.

24 Claims, 11 Drawing Sheets

(58) Field of Classification Search
CPC .............. G06T 2213/00; G06T 2213/04; G06T 2213/08; G06T 2213/12; G06T 17/00; G06T 19/006; G06N 20/00
See application file for complete search history.

(56) References Cited

U.S. PATENT DOCUMENTS

2020/0104684 A1   4/2020   Vecerik et al.
2020/0122040 A1   4/2020   Juliani, Jr. et al.

OTHER PUBLICATIONS

Jonathan Ho et al., "Generative Adversarial Imitation Learning," Advances in neural information processing systems 29 (2016): pp. 4565-4573.

Wenwen Si et al., "AGen: Adaptable Generative Prediction Networks for Autonomous Driving," 2019 IEEE Intelligent Vehicles Symposium (IV). IEEE, 2019, pp. 1-6.

* cited by examiner

METHOD AND DEVICE FOR MODELING A BEHAVIOR WITH SYNTHETIC TRAINING DATA

CROSS-REFERENCE TO RELATED APPLICATIONS

This application claims the benefit of U.S. Provisional Patent Application No. 63/139,898, filed on Jan. 21, 2021, which is herein incorporated by reference in its entirety.

TECHNICAL FIELD

The present disclosure generally relates to training behavior models and, in particular, to systems, devices, and methods for modeling one or more behaviors with synthetic training data.

BACKGROUND

Imitation learning may be leveraged to train a virtual agent (down to the root motion level) based on real-world behaviors. However, this approach requires a large amount of varied training data with respect to the real-world behaviors in order to produce a well-trained virtual agent.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
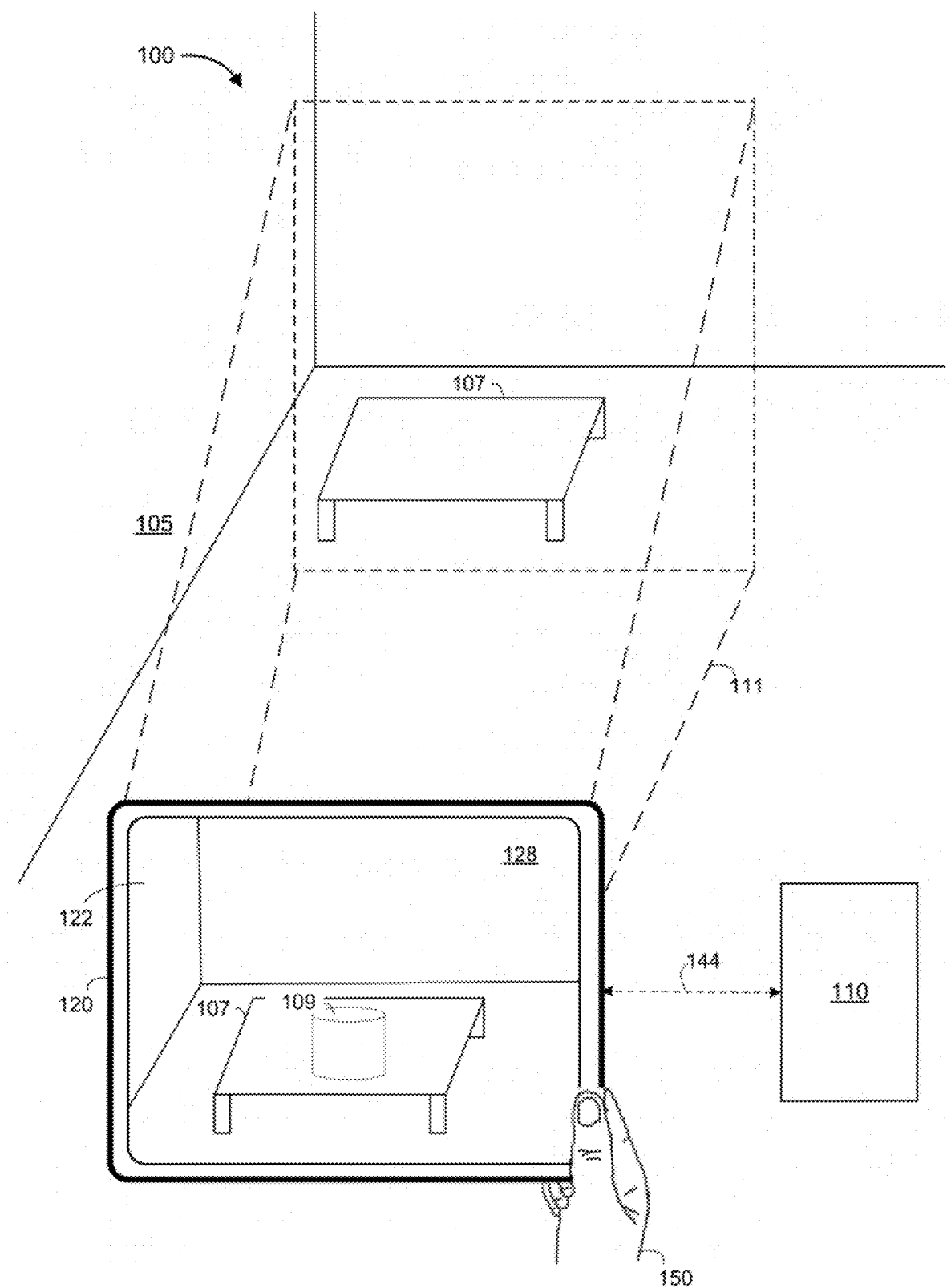
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for training a behavior model for a virtual agent based at least in part on synthetic training data. According to some implementations, the method is performed at a computing system including non-transitory memory and one or more processors, wherein the computing system is communicatively coupled to a display device and one or more input devices. The method includes: obtaining source content that includes an entity performing one or more actions within an environment; generating a first environment characterization vector including a plurality of characterization information portions characterizing the environment; generating a first set of behavioral trajectories associated with the one or more actions of the entity based on the source content and the first characterization vector for the environment; generating a second environment characterization vector for the environment by perturbing at least some of the plurality of characterization information portions; generating a second set of behavioral trajectories associated with one or more potential actions of the entity based on the source content and the second characterization vector for the environment; and training a behavior model for a virtual agent based on the first and second sets of behavioral trajectories in order to imitate the entity.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11 x, IEEE 802.16 x, IEEE 802.3 x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3 D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
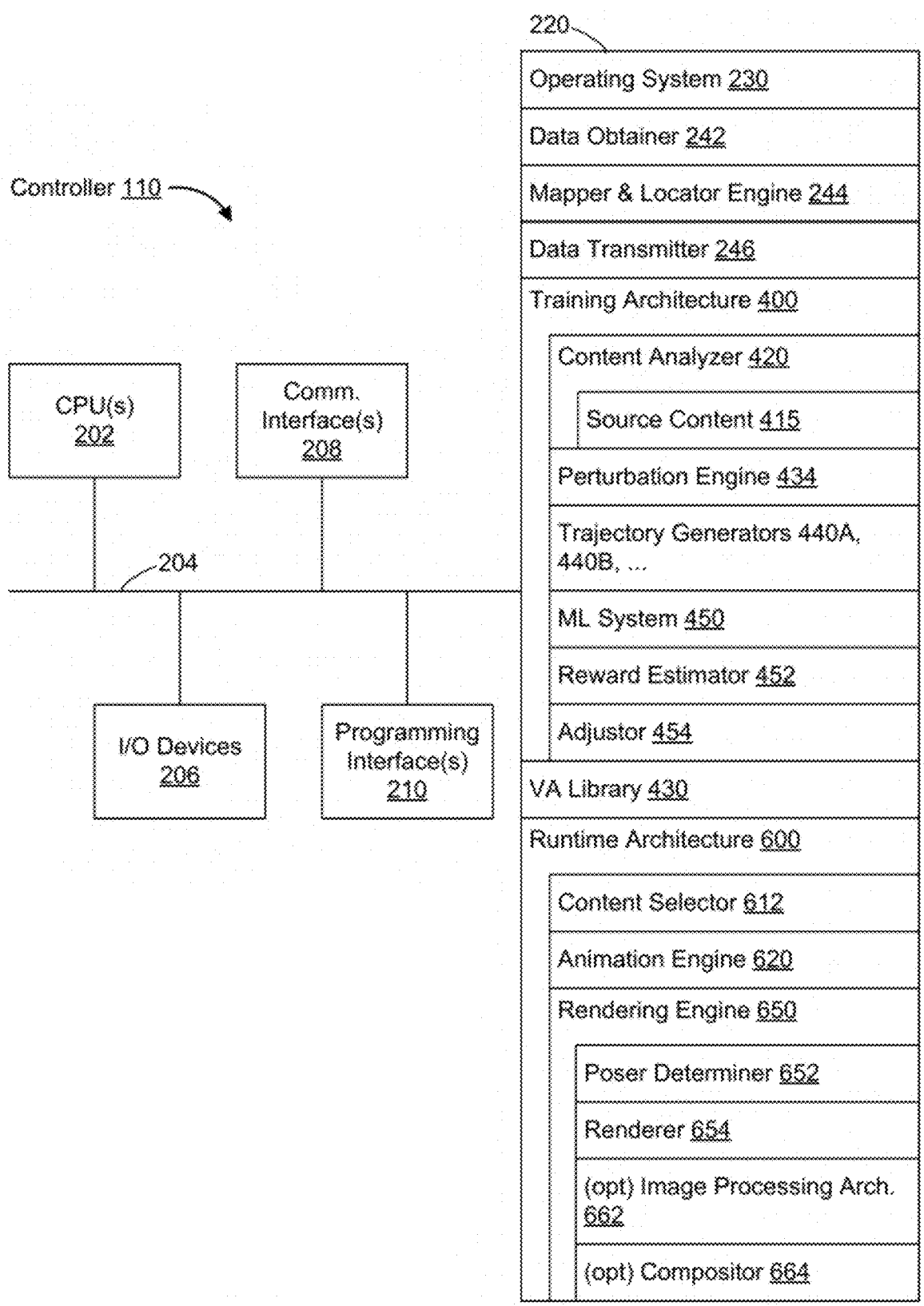
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3 x, IEEE 802.11 x, IEEE 802.16 x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a training architecture 400 is configured to populate a virtual agent (VA) library 430 based at least in part on source content 415. The training architecture 400 is described in more detail below with reference to FIG. 4A. To that end, in various implementations, the training architecture 400 includes instructions and/or logic therefor, and heuristics and metadata therefor. In some implementations, the training architecture 400 includes: a content analyzer 420; a perturbation engine 434; a plurality of trajectory generators 440A, 440B, . . . ; an ML system 450; a reward estimator 452; and an adjustor 454.

In some implementations, the content analyzer 420 is configured to ingest and analyze the source content 415 that includes an entity performing one or more actions within an environment. For example, the source content 415 corresponds to one of: a live image/video stream such as a locally or remotely captured image/video stream; pre-existing audio/video (A/V) such as a movie, a TV episode, etc.; or the like. In some implementations, the content analyzer 420 is also configured to identify or select the entity within the source content 415 (e.g., based on a user input, object recognition, and/or the like). In some implementations, the content analyzer 420 is further configured to generate, based on the source content 415, a three-dimensional (3 D) model 422A and an initial behavior model 424A for the entity. In some implementations, the content analyzer 420 is further configured to generate, based on the source content 415, a first environment characterization vector 433 for the environment including a plurality of information portions characterizing the environment. Environment characterization vectors are described in more detail below with reference to FIG. 4B. The content analyzer 420 is described in more detail below with reference to FIG. 4A. To that end, in various implementations, the content analyzer 420 includes instructions and/or logic therefor, and heuristics and metadata therefor.

In some implementations, the perturbation engine 434 is configured to generate a second environment characterization vector 435 for the environment by perturbing at least some of the plurality of characterization information portions of the first environment characterization vector 433. The perturbation engine 434 is described in more detail below with reference to FIG. 4A. To that end, in various implementations, the perturbation engine 434 includes instructions and/or logic therefor, and heuristics and metadata therefor.

In some implementations, the trajectory generator 440A is configured to generate a first set of behavioral trajectories 442 associated with the one or more actions of the entity based on the initial behavior model 424A and the first characterization vector for the environment 433. In some implementations, the trajectory generator 440B is configured to generate a second set of behavioral trajectories 444 associated with one or more potential actions of the entity based on the initial behavior model 424A and the second characterization vector for the environment 435. The plurality of trajectory generators 440A, 440B, . . . are described in more detail below with reference to FIG. 4A. To that end, in various implementations, the plurality of trajectory generators 440A, 440B, . . . include instructions and/or logic therefor, and heuristics and metadata therefor.

In some implementations, the machine learning (ML) system 450 is configured to generate a trained behavior model 451A based on the first set of behavioral trajectories 442 and the second set of behavioral trajectories 444. For example, the ML system 450 corresponds to a neural network (NN), a convolutional neural network (CNN), a deep neural network (DNN), a recurrent neural network (RNN), a support vector machine (SVM), a relevance vector machine (RVM), a random forest algorithm, or the like. The ML system 450 is described in more detail below with reference to FIG. 4D. To that end, in various implementations, the ML system 450 includes instructions and/or logic therefor, and heuristics and metadata therefor.

In some implementations, the reward estimator 452 is configured to generate a reward signal 453 (e.g., a confidence score, a quality score, or the like) for the trained behavior model 451A and to send the reward signal 453 to the adjustor 454. The reward estimator 452 is described in more detail below with reference to FIG. 4A. To that end, in various implementations, the reward estimator 452 includes instructions and/or logic therefor, and heuristics and metadata therefor.

In some implementations, the adjustor 454 is configured to adjust one or more operating parameters 455 (e.g., filter weights, neurons, etc.) of the ML system 450 in accordance with a determination that the reward signal 453 fails to satisfy a threshold convergence metric. In some implementations, the adjustor 454 is configured to forgo adjusting the one or more operating parameters 455 of the ML system 450 in accordance with a determination that the reward signal 453 satisfies the threshold convergence metric. The adjustor 454 is described in more detail below with reference to FIG. 4A. To that end, in various implementations, the adjustor 454 includes instructions and/or logic therefor, and heuristics and metadata therefor.

In some implementations, the VA library 430 stores a plurality of entries (e.g., rows) each associated with a respective subject (or virtual agent) such as the entity within the environment from the source content 415. According to some implementations, a respective entry within the VA library 430 that corresponds to the entity within the environment from the source content 415 includes an identifier 421A associated with the entity such as a label or the like, the 3 D model 422A, the initial behavior model 424A, the trained behavior model 451A (that satisfies the threshold convergence metric), and/or miscellaneous information 428A. The VA library 430 is described in more detail below with reference to FIG. 4C. In some implementations, the VA library 430 is stored locally relative to the controller 110. In some implementations, the VA library 430 is located remote from the controller 110 (e.g., at a remote server, a cloud server, or the like).

In some implementations, a runtime architecture 600 is configured to animate a VA within an XR environment based on the VA library 430 populated by the training architecture 400. The runtime architecture 600 is described in more detail below with reference to FIG. 6. To that end, in various implementations, the runtime architecture 600 includes instructions and/or logic therefor, and heuristics and metadata therefor. In some implementations, the runtime architecture 600 includes: a content selector 612, an animation engine 620, and a rendering engine 650.

In some implementations, the content selector 612 is configured to select a VA from the VA library 430 (and its associated 3 D model and trained behavior model) based on one or more user requests and/or inputs (e.g., a voice command, a selection from a user interface (UI) menu of VAs, and/or the like). The content selector 612 is described in more detail below with reference to FIG. 6. To that end, in various implementations, the content selector 612 includes instructions and/or logic therefor, and heuristics and metadata therefor.

In some implementations, an animation engine 620 is configured to generate an animation of the selected VA performing one or more actions based on the 3 D model 431A associated with the selected VA and the trained behavior model 451A associated with the selected VA. The animation engine 620 is described in more detail below with reference to FIG. 6. To that end, in various implementations, the animation engine 620 includes instructions and/or logic therefor, and heuristics and metadata therefor.

In some implementations, a rendering engine 650 is configured to render a XR environment (sometimes also referred to herein as a "graphical environment" or "virtual environment") or image frame associated therewith that includes the animation of the selected VA. To that end, in various implementations, the rendering engine 650 includes instructions and/or logic therefor, and heuristics and metadata therefor. In some implementations, the rendering engine 650 includes a pose determiner 652, a renderer 654, an optional image processing architecture 662, and an optional compositor 664.

In some implementations, the pose determiner 652 is configured to determine a current camera pose of the electronic device 120 and/or the user 150 relative to the selected VA and/or other XR content associated with the XR environment. The pose determiner 652 is described in more detail below with reference to FIG. 6. To that end, in various implementations, the pose determiner 652 includes instructions and/or logic therefor, and heuristics and metadata therefor.

In some implementations, the renderer 654 is configured to render the XR environment including the animation of the selected VA according to the current camera pose relative thereto. The renderer 654 is described in more detail below with reference to FIG. 6. To that end, in various implementations, the renderer 654 includes instructions and/or logic therefor, and heuristics and metadata therefor.

In some implementations, the image processing architecture 662 is configured to obtain (e.g., receive, retrieve, or capture) an image stream including one or more images of the physical environment 105 from the current camera pose of the electronic device 120 and/or the user 150. In some implementations, the image processing architecture 662 is also configured to perform one or more image processing operations on the image stream such as warping, color correction, gamma correction, sharpening, noise reduction, white balance, and/or the like. The image processing architecture 662 is described in more detail below with reference to FIG. 6. To that end, in various implementations, the image processing architecture 662 includes instructions and/or logic therefor, and heuristics and metadata therefor.

In some implementations, the compositor 664 is configured to composite the rendered XR environment with the processed image stream of the physical environment 105 from the image processing architecture 662 to produce rendered image frames of the XR environment for display. The compositor 664 is described in more detail below with reference to FIG. 6. To that end, in various implementations, the compositor 664 includes instructions and/or logic therefor, and heuristics and metadata therefor.

Although the data obtainer 242, the mapper and locator engine 244, the data transmitter 246, the training architecture 400, and the runtime architecture 600 are shown as residing on a single device (e.g., the controller 110), it should be understood that in other implementations, any combination of the data obtainer 242, the mapper and locator engine 244, the data transmitter 246, the training architecture 400, and the runtime architecture 600 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
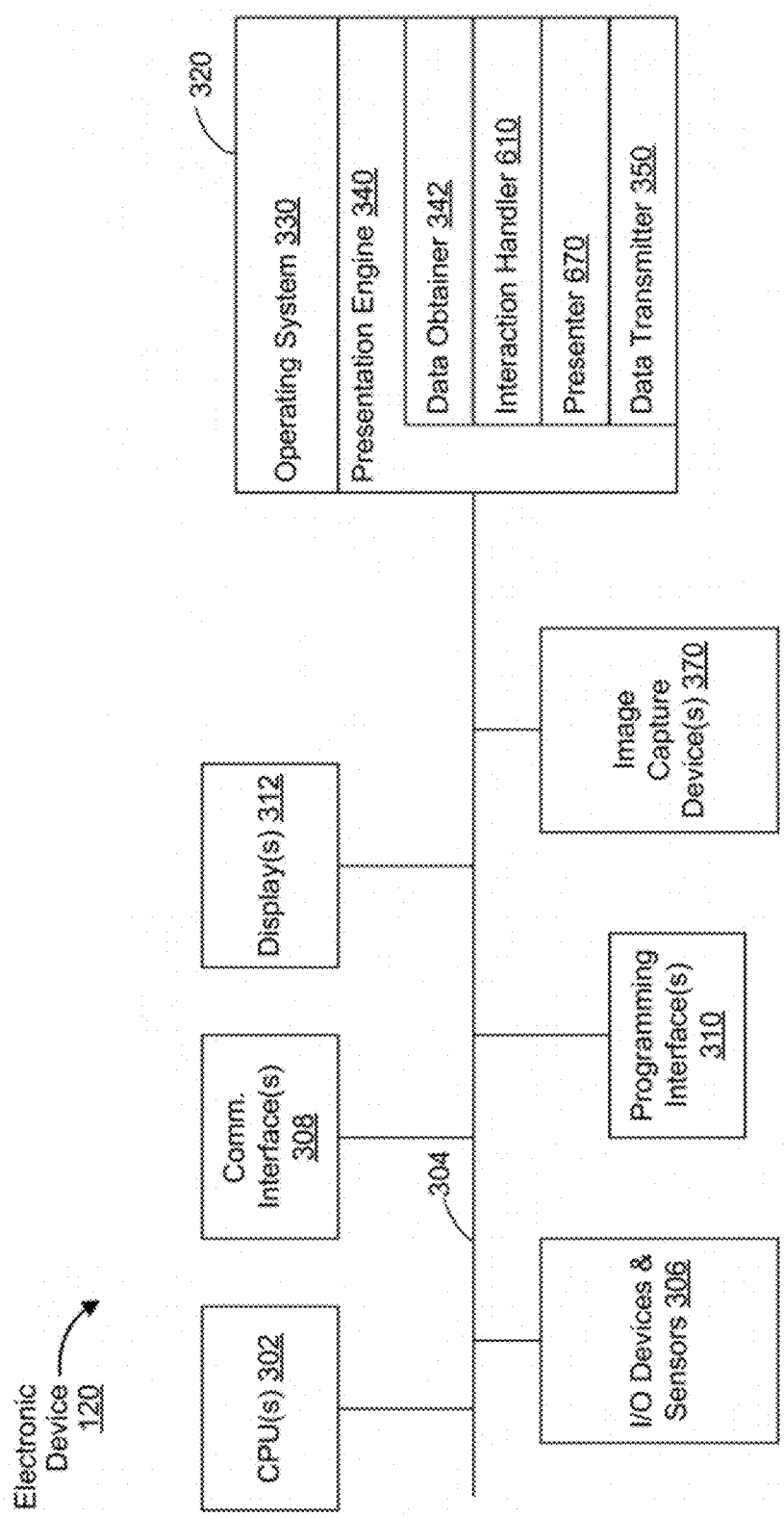
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 670, an interaction handler 610, and a data transmitter 350.

In some implementations, the data obtainer 342 is configured to obtain data (e.g., presentation data such as rendered image frames associated with the user interface or the XR environment, blended animation(s), input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 670 is configured to present and update A/V content and/or XR content (e.g., the rendered image frames associated with the user interface or the XR environment) via the one or more displays 312. To that end, in various implementations, the presenter 670 includes instructions and/or logic therefor, and heuristics and metadata therefor.

In some implementations, the interaction handler 610 is configured to detect user interactions with the presented A/V content and/or XR content (e.g., gestural inputs detected via hand tracking, eye gaze inputs detected via eye tracking, voice commands, etc.). To that end, in various implementations, the interaction handler 610 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 610, the presenter 670, and the data transmitter 350 are shown as residing on a single device (e.g., the electronic device 120), it should be understood that in other implementations, any combination of the data obtainer 342, the interaction handler 610, the presenter 670, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
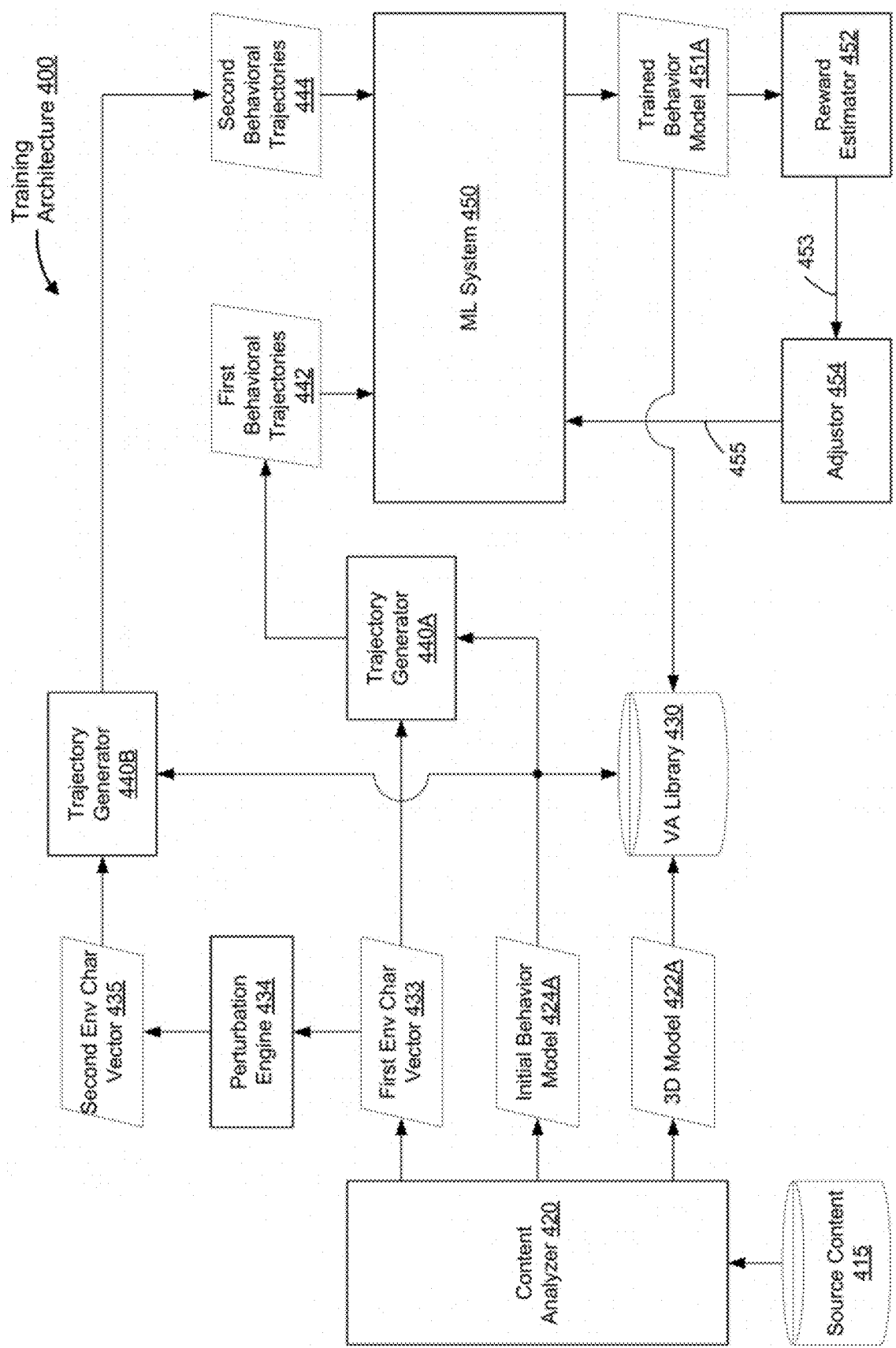
FIG. 4A is a block diagram of an example training architecture in accordance with some implementations.

FIG. 4A is a block diagram of an example training architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the animation architecture 400 is included in a computing system such as the controller 110 shown in FIGS. 1 and 2; the electronic device 120 shown in FIGS. 1 and 3; and/or a suitable combination thereof As shown in FIG. 4A, the content analyzer 420 ingests the source content 415 that includes an entity performing one or more actions within an environment. For example, the source content 415 corresponds to one of: a live image/video stream such as a locally or remotely captured image/video stream; pre-existing audio/video (A/V) such as a movie, a TV episode, etc.; or the like.

According to some implementations, the content analyzer 420 identifies or selects an entity within the source content 415 (e.g., based on a user input, object recognition, instance segmentation, and/or the like). As shown in FIG. 4A, the content analyzer 420 generates, based on the source content 415, a 3 D model 422A for the entity (e.g., based on photogrammetry or other computer vision techniques) and an initial behavior model 424A for the entity (e.g., based on behavior recognition techniques). As shown in FIG. 4A, the training architecture 400 stores the 3 D model 422A and the initial behavior model 424A in an entry associated with the entity within the VA library 430. In some implementations, the training architecture 400 determines an object label for the entity and obtains (e.g., receives or retrieves) a 3 D model for the entity and a generic behavior model for the entity from a model library based on the object label. As such, for example, if the training architecture 400 determines that the entity corresponds to a Labrador Retriever, the training architecture 400 obtains a 3 D model associated with Labrador Retrievers and a generic behavior model associated with Labrador Retrievers from the model library.

Figure 4B:
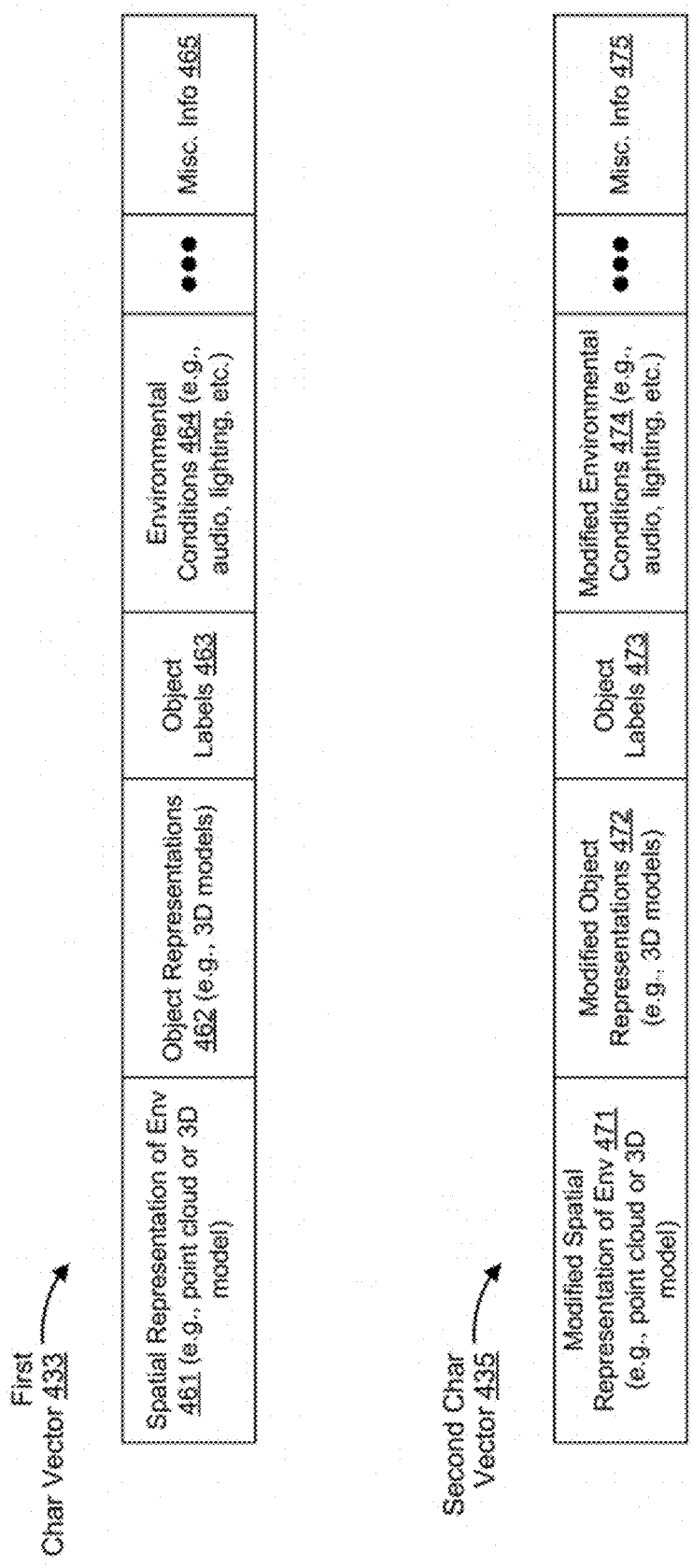
FIGS. 4B and 4C illustrate example data structures in accordance with some implementations.

As shown in FIG. 4A, the content analyzer 420 generates, based on the source content 415, a first environment characterization vector 433 for the environment including a plurality of information portions characterizing the environment (e.g., based on image segmentation techniques, instance segmentation techniques, object recognition techniques, 3 D scene reconstruction techniques, etc.). FIG. 4B shows an example data structure for the first environment characterization vector 433 in accordance with some implementations. One of ordinary skill in the art will appreciate that the first environment characterization vector 433 shown in FIG. 4B is an example data structure that may be formatted differently and otherwise modified in various other implementations. According to some implementations, the first environment characterization vector 433 characterizes an initial state of the environment, where the environment corresponds to a theatrical scene or the like within the source content 415. As shown in FIG. 4B, the first environment characterization vector 433 includes: a spatial representation of the environment 461 (e.g., a point cloud, 3 D model, and/or the like); one or more object representations 462 (e.g., 3 D models) associated with entities, objects, content, etc. recognized within the environment; one or more object labels 463 associated with the entities, objects, obstacles, content, etc. recognized within the initial state of the environment; environmental conditions 464 associated with the initial state of the environment (e.g., ambient audio information, ambient lighting information, weather parameters, etc.); and miscellaneous information 465 associated with the initial state of the environment.

As shown in FIG. 4A, the perturbation engine 434 generates a second environment characterization vector 435 for the environment by perturbing (or modifying) at least some of the plurality of characterization information portions of the first environment characterization vector 433. In some implementations, the perturbation engine 434 perturbs (or modifies) at least some of the plurality of characterization information portions of the first environment characterization vector 433 based on a random, pseudo-random, deterministic, procedural, and/or a like process.

FIG. 4B shows an example data structure for the second environment characterization vector 435 in accordance with some implementations. One of ordinary skill in the art will appreciate that the second environment characterization vector 435 shown in FIG. 4B is an example data structure that may be formatted differently and otherwise modified in various other implementations. According to some implementations, the second environment characterization vector 435 environment characterizes a modified state of the environment. As shown in FIG. 4B, the second environment characterization vector 435 includes: a modified spatial representation of the environment 471 (e.g., a modified point cloud, 3 D model, and/or the like); one or more modified object representations 472 (e.g., 3 D models) associated with modified entities, objects, content, etc. within the modified state of the environment; one or more object labels 473 associated with the modified entities, objects, obstacles, content, etc. within the modified state of the environment; modified environmental conditions 474 associated with the modified state of the environment (e.g., modified ambient audio information, ambient lighting information, weather parameters, etc.); and miscellaneous information 475 associated with the modified state of the environment.

As shown in FIG. 4A, the trajectory generator 440A generates a first set of behavioral trajectories 442 associated with the one or more actions of the entity with the source content 415 based on the initial behavior model 424A and the first characterization vector for the environment 433. As shown in FIG. 4A, the trajectory generator 440B generates a second set of behavioral trajectories 444 associated with one or more potential actions of the entity based on the initial behavior model 424A and the second characterization vector for the environment 435. One of ordinary skill in the art will appreciate that the plurality of trajectory generators 440A, 440B, ... may correspond to a single trajectory generator in various implementations that generates the first set of behavioral trajectories 442 and the second set of behavioral trajectories 444 in series or in parallel. One of ordinary skill in the art will appreciate that although the training architecture 400 in FIG. 4A illustrates two trajectory generators 440A and 440B, the training architecture 400 may include additional trajectory generators that generate additional sets of behavioral trajectories based on additional environment characterization vectors from the perturbation engine 434.

As shown in FIG. 4A, the ML system 450 generate a trained behavior model 451A based on the first set of behavioral trajectories 442 and the second set of behavioral trajectories 444. In some implementations, the ML system 450 corresponds to an NN, a CNN, a DNN, a RNN, an SVM, an RVM, a random forest algorithm, or the like.

As shown in FIG. 4A, the reward estimator 452 generates a reward signal 453 (e.g., a confidence or quality score) for the trained behavior model 451A and sends the reward signal 453 to the adjustor 454. As shown in FIG. 4A, the adjustor 454 adjusts one or more operating parameters 455 (e.g., filter weights, neurons, etc.) of the ML system 450 in accordance with a determination that the reward signal 453 fails to satisfy a threshold convergence metric. As shown in FIG. 4A, the adjustor 454 forgoes adjusting the one or more operating parameters 455 of the ML system 450 in accordance with a determination that the reward signal 453 satisfies the threshold convergence metric. As shown in FIG. 4A, the training architecture 400 stores the trained behavior model 451A in the entry associated with the entity within the VA library 430 when the reward signal 453 satisfies the threshold convergence metric.

Figure 4C:
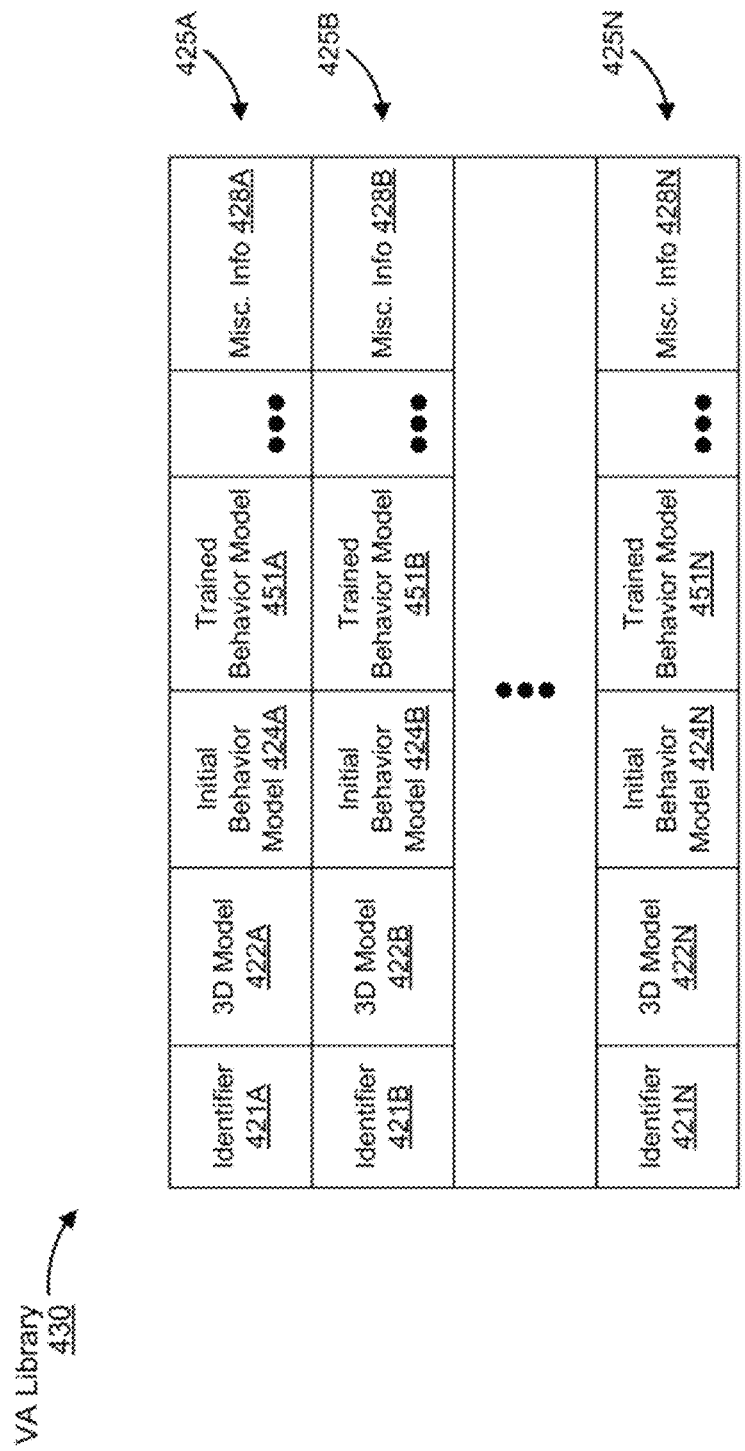

FIG. 4C shows an example data structure for the VA library 430 in accordance with some implementations. One of ordinary skill in the art will appreciate that the VA library 430 shown in FIG. 4C is an example data structure that may be formatted differently and otherwise modified in various other implementations. As shown in FIG. 4C, the VA library 430 includes a plurality of different entries 425A, 425B, . . . , 425N each associated with a different entity (or VA). For example, the entry 425A associated with the respective entity referenced with respect to FIG. 4A includes: an identifier 421A associated with the respective entity such as a label, a serial number, or the like; the 3 D model 422A for the respective entity;

the initial behavior model 424A associated with the respective entity; the trained behavior model 451A associated with the respective entity (that satisfies the threshold convergence metric); and/or miscellaneous information 428A associated with the respective entity. The entries 425B, . . . , 425N includes similar information portions but are not described for the sake of brevity.

Figure 4D:
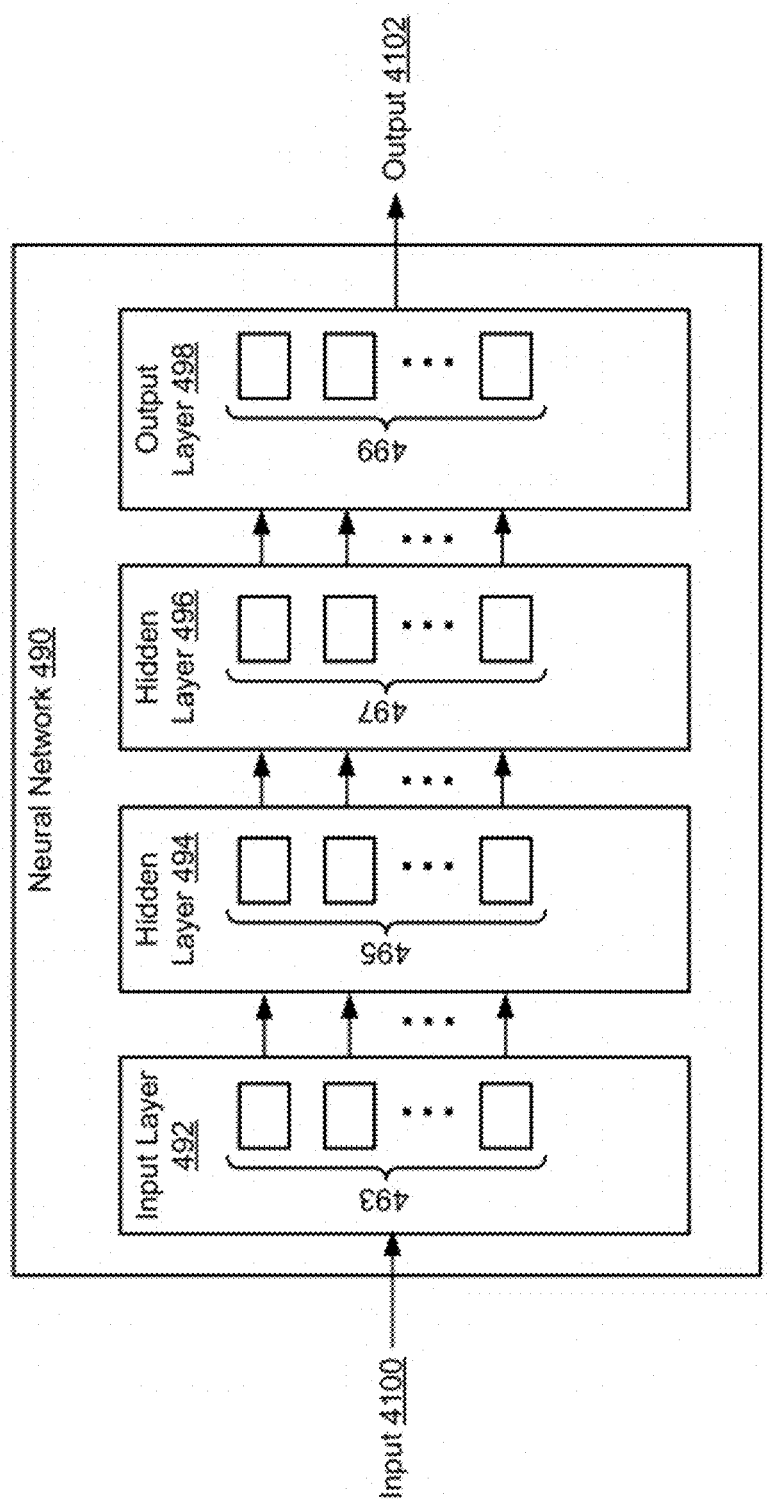
FIG. 4D is a block diagram of an example neural network in accordance with some implementations.

FIG. 4D is a block diagram of an example neural network 490 according to some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the neural network 490 may correspond to the ML system 450 in FIGS. 2 and 4A. To that end, as a non-limiting example, in some implementations, the neural network 490 includes an input layer 492, a first hidden layer 494, a second hidden layer 496, and an output layer 498. While the neural network 490 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 492 is coupled (e.g., configured) to receive an input 4100. For example, with reference to FIG. 4A, the input 4100 corresponds to the first set of behavioral trajectories 442 and the second set of behavioral trajectories 444. In various implementations, the input layer 492 includes a number of long short-term memory (LSTM) logic units 493 or the like, which are also referred to as model(s) of neurons by those of ordinary skill in the art. In some such implementations, an input matrix from the features to the LSTM logic units 493 include rectangular matrices. For example, the size of this matrix is a function of the number of features included in the feature stream.

In some implementations, the first hidden layer 494 includes a number of LSTM logic units 495 or the like. As illustrated in the example of FIG. 4D, the first hidden layer 494 receives its inputs from the input layer 492. For example, the first hidden layer 494 performs one or more of following: a convolutional operation, a nonlinearity operation, a normalization operation, a pooling operation, and/or the like. In some implementations, the number of LSTM logic units 495 is the same as or similar to the number of LSTM logic units 493 in the input layer 492.

In some implementations, the second hidden layer 496 includes a number of LSTM logic units 497 or the like. In some implementations, the number of LSTM logic units 497 is the same as or similar to the number of LSTM logic units 493 in the input layer 492 or the number of LSTM logic units 495 in the first hidden layer 494. As illustrated in the example of FIG. 4D, the second hidden layer 496 receives its inputs from the first hidden layer 494. Additionally, and/or alternatively, in some implementations, the second hidden layer 496 receives its inputs from the input layer 492. For example, the second hidden layer 496 performs one or more of following: a convolutional operation, a nonlinearity operation, a normalization operation, a pooling operation, and/or the like.

In some implementations, the output layer 498 includes a number of LSTM logic units 499 or the like. In some implementations, the number of LSTM logic units 499 is the same as or similar to the number of LSTM logic units 493 in the input layer 492, the number of LSTM logic units 495 in the first hidden layer 494, or the number of LSTM logic units 497 in the second hidden layer 496. In some implementations, the output layer 498 is a task-dependent layer that performs behavioral trajectory tasks, behavior modeling tasks, or other related tasks. In some implementations, the output layer 498 includes an implementation of a multinomial logistic function (e.g., a soft-max function) that produces an output 4102. For example, with reference to FIG. 4A, the output 4102 corresponds to the trained behavior model 451A.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 5A:
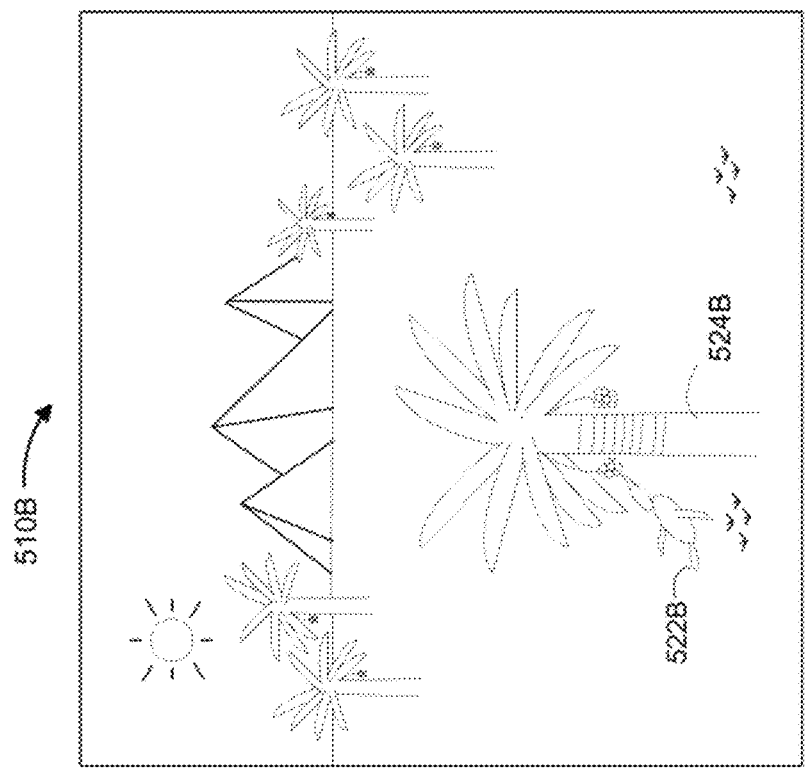
FIGS. 5A and 5B illustrate example environments in accordance with some implementations.
Figure 5A:
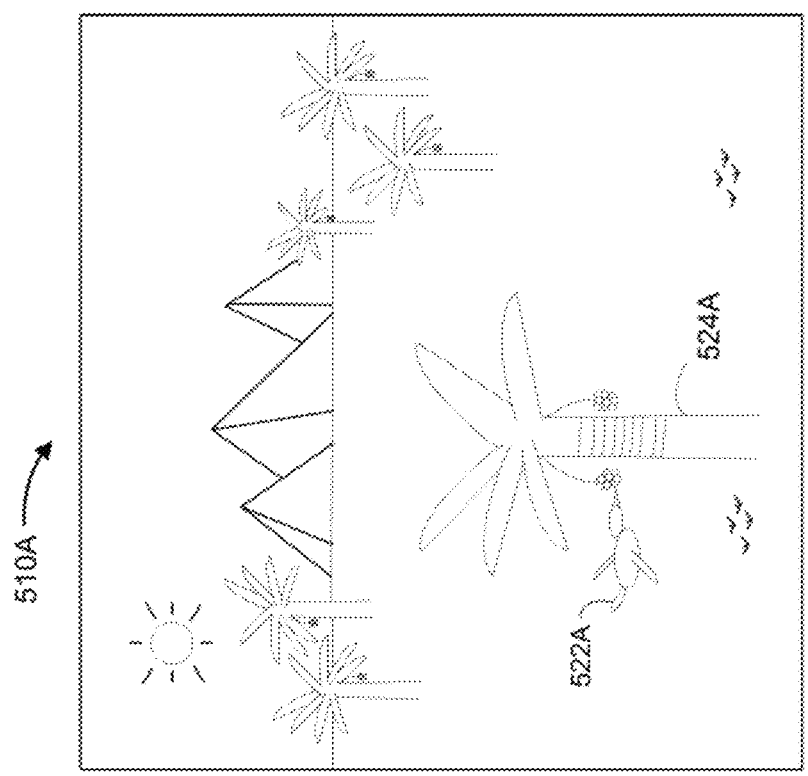

FIG. 5A illustrates an initial state of an environment 510A and a modified state of the environment 510B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, FIG. 5A illustrates an initial state of the environment 510A and a modified state of the environment 510B. For example, the initial state of the environment 510A corresponds to an image or portion of the source content 415, and the modified state of the environment 510B corresponds to a perturbed or artificially modified version of the initial state of the environment 510A.

As shown in FIG. 5A, the initial state of the environment 510A includes an entity 522A (e.g., a bird) and a date palm 524A from which the entity 522A is attempting to gather food (e.g., dates). In the initial state of the environment 510A, the date palm 524A includes five fronds. As shown in FIG. 5A, the modified state of the environment 510B includes a representation of the entity 522B (e.g., a 3 D model of the bird) and a modified representation of the date palm 524B from which the representation of the entity 522B is attempting to gather food (e.g., dates). In the modified state of the environment 510B, the modified representation of the date palm 524B includes more fronds—ten in total as compared to five fronds. As such, in this example, the representation of the entity 522B modifies its trajectory or path to gather food (e.g., dates) from the modified representation of the date palm 524B.

Figure 5B:
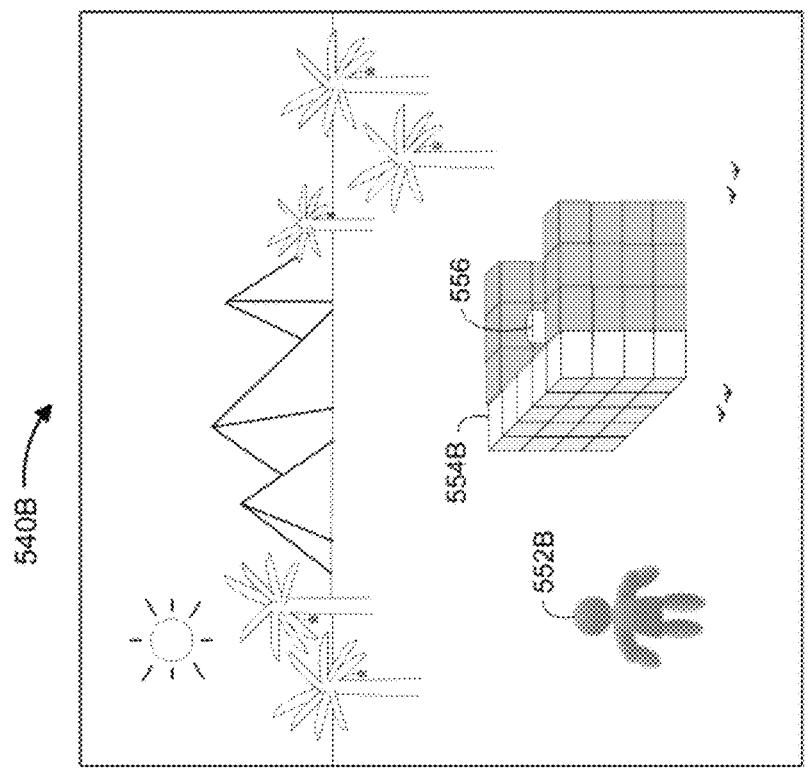
Figure 5B:
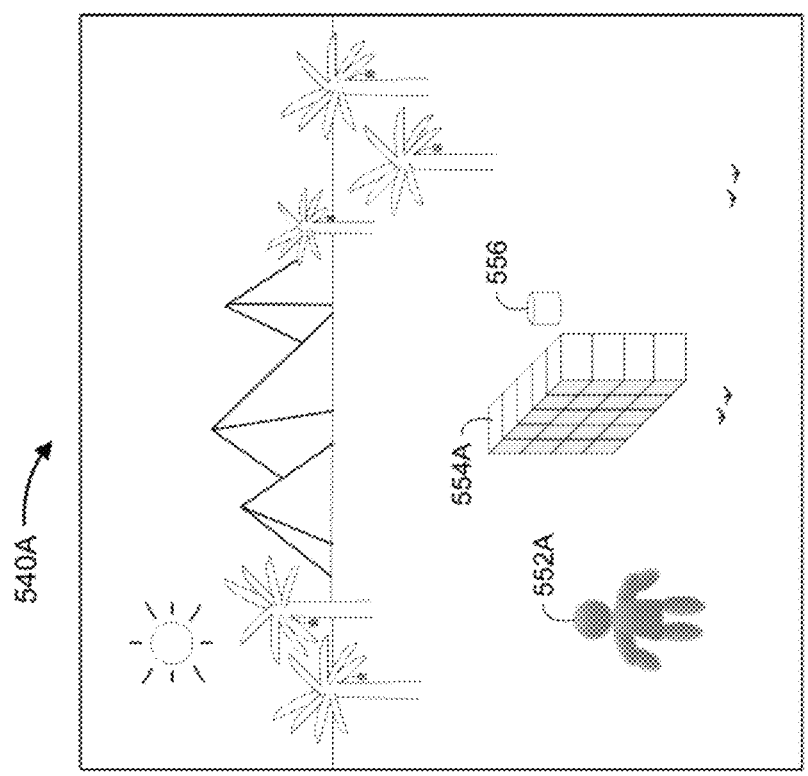

FIG. 5B illustrates an initial state of an environment 540A and a modified state of the environment 540B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, FIG. 5B illustrates an initial state of the environment 540A and a modified state of the environment 540B. For example, the initial state of the environment 540A corresponds to an image or portion of the source content 415, and the modified state of the environment 540B corresponds to a perturbed or artificially modified version of the initial state of the environment 540A.

As shown in FIG. 5B, the initial state of the environment 540A includes an entity 552A (e.g., a humanoid) and an object 556 behind a wall 554A that the entity 552A is attempting to locomote to and/or pick up. In the initial state of the environment 540A, the wall 554A extends along a single y-axis. As shown in FIG. 5B, the modified state of the environment 540B includes a representation of the entity 552B (e.g., a 3 D model of the humanoid) and a modified representation of the wall 554B around which the representation of the entity 552B is attempting to locomote to and/or pick up the object 556. In the modified state of the environment 540B, the modified representation of the wall 554B includes two additional parallel wings extending along an x-axis. As such, in this example, the representation of the entity 552B modifies its trajectory or path when locomoting around modified representation of the wall 554B to pick up the object 556.

Figure 6:
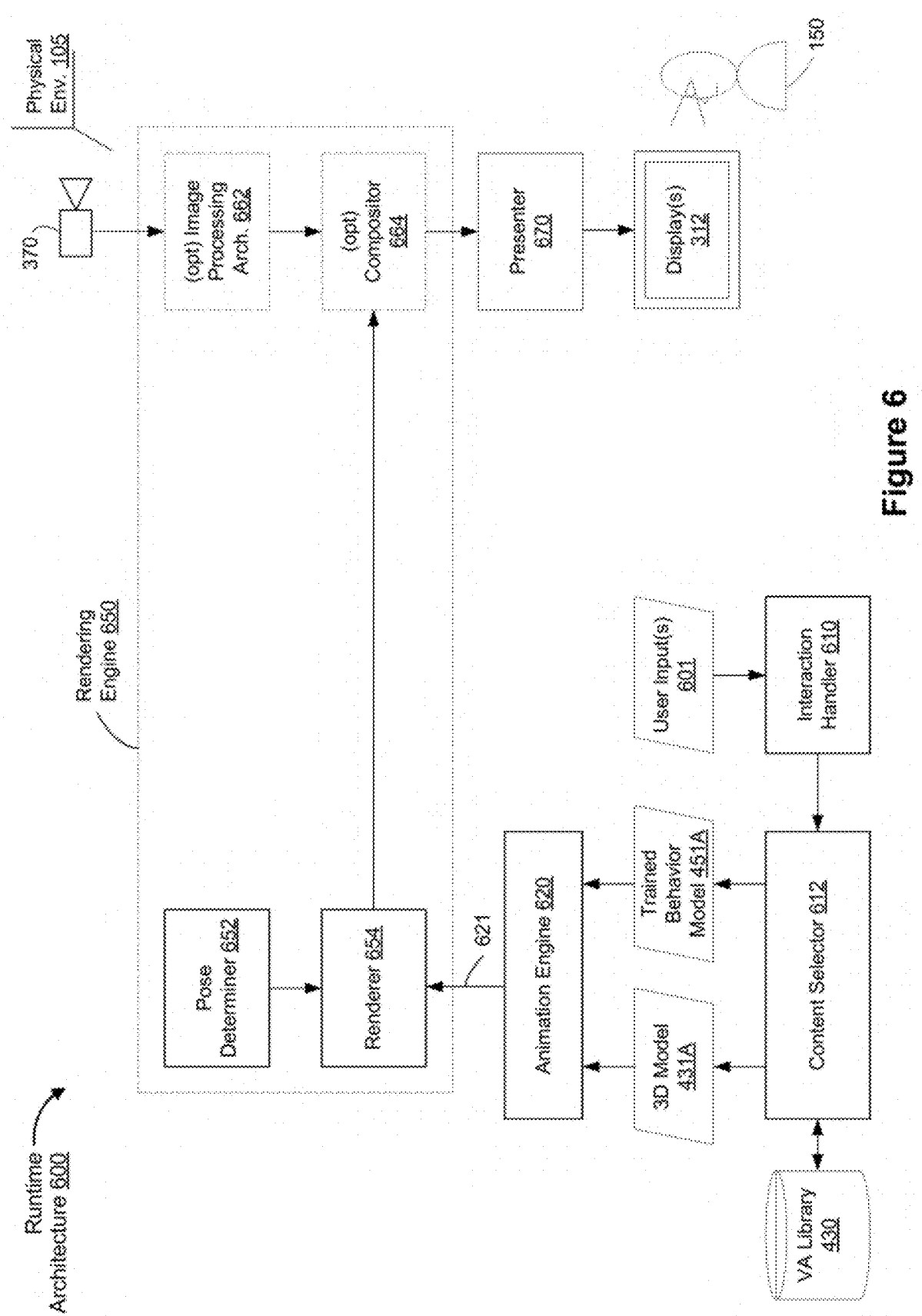
FIG. 6 is a block diagram of an example runtime architecture in accordance with some implementations.

FIG. 6 is a block diagram of an example runtime architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content runtime architecture 600 is included in a computing system such as the controller 110 shown in FIGS. 1 and 2; the electronic device 120 shown in FIGS. 1 and 3; and/or a suitable combination thereof.

As shown in FIG. 6, the interaction handler 610 obtains (e.g., receives, retrieves, or detects) one or more user inputs 601 provided by the user 150 that are associated with selecting a virtual agent (VA). For example, the one or more user inputs 601 correspond to a gestural input selecting the VA from a UI menu detected via hand tracking, an eye gaze input selecting the VA from the UI menu detected via eye tracking, a voice command selecting the VA from the UI menu detected via a microphone, and/or the like. In some implementations, the content selector 612 obtains the 3 D model 431A and the trained behavior model 451A from the VA library 430 that correspond to the selected VA. For example, the VA corresponds to an animal, a vehicle, a robot, a humanoid, or the like, which is instantiated within the XR environment. Continuing with this example, the user 150 may interact with the VA, and the VA may be animatable or otherwise enabled to translate and/or rotate within the XR environment. In various implementations, the animation engine 620 generates an animation 621 including the VA performing one or more actions based on the 3 D model 431A and the trained behavior model 451A.

According to some implementations, the pose determiner 652 determines a current camera pose of the electronic device 120 and/or the user 150 relative to the VA and/or the physical environment 105. In some implementations, the renderer 654 renders the XR environment including the animation of the VA according to the current camera pose relative thereto. According to some implementations, the optional image processing architecture 662 obtains an image stream from an image capture device 370 including one or more images of the physical environment 105 from the current camera pose of the electronic device 120 and/or the user 150. In some implementations, the image processing architecture 662 also performs one or more image processing operations on the image stream such as warping, color correction, gamma correction, sharpening, noise reduction, white balance, and/or the like. In some implementations, the optional compositor 664 composites the rendered XR environment VA with the processed image stream of the physical environment 105 from the image processing architecture 662 to produce rendered image frames of the XR environment. In various implementations, the presenter 670 presents the rendered image frames of the XR environment to the user 150 (e.g., via the one or more displays 312 of the electronic device 120). One of ordinary skill in the art will appreciate that the optional image processing architecture 662 and the optional compositor 664 may not be applicable for fully virtual environments (or optical see-through scenarios).

Figure 7:
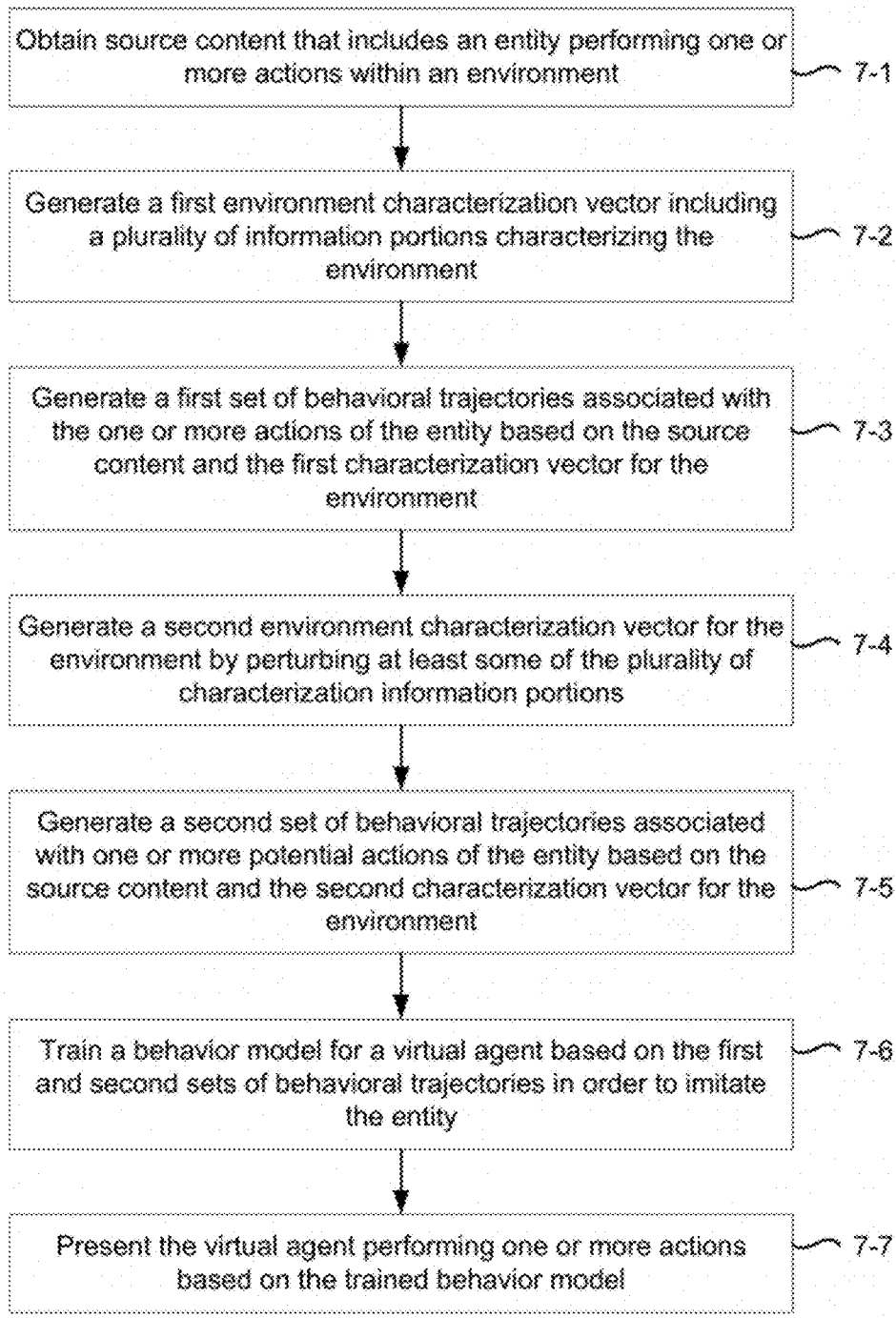
FIG. 7 is a flowchart representation of a method of training a behavior model for a virtual agent based at least in part on synthetic training data in accordance with some implementations.

FIG. 7 is a flowchart representation of a method 700 of training a behavior model with synthetic training data in accordance with some implementations. In various implementations, the method 700 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the computing system includes the animation architecture 400 in FIG. 4A and the rendering architecture 600 in FIG. 6. In some implementations, the method 700 is performed by processing logic, including hardware, firmware, software, or a combination thereof. In some implementations, the method 700 is performed by a processor executing code stored in anon-transitory computer-readable medium (e.g., a memory). In some implementations, the computing system corresponds to one of a tablet, a laptop, a mobile phone, a near-eye system, a wearable computing device, or the like. In some implementations, the computing system (or a component thereof) corresponds to a virtual agent operating system.

As discussed above, imitation learning may be leveraged to train a virtual agent (down to the root motion level) based on real-world behaviors. However, this approach requires a large amount of varied training data with respect to the real-world behaviors in order to produce a well-trained virtual agent. In contrast, according to various implementations, the method described herein increase the entropy of a training corpus by: (A) obtaining primary training data; and (B) perturbing the primary training data to produce secondary training data. The secondary training data may include modified objects, obstacles, environmental conditions, etc. as compared to the primary training data. As such, a virtual agent may be trained on a wider breadth of training data with greater entropy/variability than training on the primary training data alone.

As represented by block 7-1, the method 700 includes obtaining source content that includes an entity performing one or more actions within an environment. With reference to FIG. 4A, the training architecture 400 or a component thereof (e.g., the content analyzer 420) ingests and analyzes the source content 415 that includes the entity performing one or more actions within the environment. In some implementations, the content analyzer 420 identifies or selects the entity from among a plurality of objects or content within the environment based on a user input, object recognition, and/or the like.

In some implementations, the entity corresponds to a human, a humanoid, an animal, a vehicle, or the like. In some implementations, the environment corresponds to a current setting within a theatrical scene of the source content. In some implementations, the source content corresponds to a live image stream, a locally captured image stream, a remotely captured image stream, a movie, a TV episode, or the like. As one example, the source content corresponds to pre-existing images/video. As another example, the source content corresponds to a live image/video stream.

As represented by block 7-2, the method 700 includes generating a first environment characterization vector including a plurality of information portions characterizing the environment. With reference to FIG. 4A, the training architecture 400 or a component thereof (e.g., the content analyzer 420) generates, based on the source content 415, a first environment characterization vector 433 for the environment including a plurality of information portions characterizing the environment. In some implementations, generating the first characterization vector includes performing image segmentation, instance segmentation, and/or the like on the source content.

In some implementations, the characterization information portions include at least one of information characterizing a first set of objects within the environment (e.g., entities or obstacles) or information characterizing a first set of environmental conditions. (e.g., the plurality of environmental characterization information portions corresponds to objects within the environment, obstacles within the environment, environmental conditions (e.g., weather), and/or the like). For example, with reference to FIG. 4B, the first environment characterization vector 433 characterizes an initial state of the environment, where the environment corresponds to a theatrical scene or the like within the source content 415. As shown in FIG. 4B, the first environment characterization vector 433 includes: a spatial representation of the environment 461 (e.g., a point cloud, 3 D model, and/or the like); one or more object representations 462 (e.g., 3 D models) associated with entities, objects, obstacles, content, etc. recognized within the environment; one or more object labels 463 associated with the entities, objects, obstacles, content, etc. recognized within the initial state of the environment; environmental conditions 464 associated with the initial state of the environment (e.g., ambient audio information, ambient lighting information, weather parameters, etc.); and miscellaneous information 465 associated with the initial state of the environment.

In some implementations, the method 700 includes generating a three-dimensional (3 D) model associated with the entity based on the source content, wherein the virtual agent corresponds to the 3 D model. With reference to FIG. 4A, the training architecture 400 or a component thereof (e.g., the content analyzer 420) generates, based on the source content 415, a 3 D model 422A for the entity based on photogrammetry or other computer vision techniques.

In some implementations, the method 700 includes generating an initial behavior model for the entity based on the source content, wherein the first set of behavioral trajectories are generated based on the initial behavior model and the first environment characterization vector, and wherein the second set of behavioral trajectories are generated based on the initial behavior model and the second environment characterization vector. With reference to FIG. 4A, the training architecture 400 or a component thereof (e.g., the content analyzer 420) generates, based on the source content 415, an initial behavior model 424A for the entity based on behavior pattern recognition techniques.

As represented by block 7-3, the method 700 includes generating a first set of behavioral trajectories associated with the one or more actions of the entity based on the source content and the first characterization vector for the environment. With reference to FIG. 4A, the training architecture 400 or a component thereof (e.g., the trajectory generator 440A) generates a first set of behavioral trajectories 442 associated with the one or more actions of the entity with the source content 415 based on the initial behavior model 424A and the first characterization vector for the environment 433.

In some implementations, the first set of behavioral trajectories are extracted from pre-existing content such as remotely and/or locally captured image streams of a physical entity in the real world. As such, for example, the virtual agent corresponds to a virtual hummingbird that will be trained to imitate a real-life hummingbird based on videos or source content thereof. In some implementations, each of the first set of behavioral trajectories correspond to physical motion plans (PMPs). For example, a PMP includes positional information, angular information, torque information, velocity/acceleration information, etc. for each joint or articulable portion of the entity.

As represented by block 7-4, the method 700 includes generating a second environment characterization vector for the environment by perturbing at least some of the plurality of characterization information portions. With reference to FIG. 4A, the training architecture 400 or a component thereof (e.g., the perturbation engine 434) generates a second environment characterization vector 435 for the environment by perturbing (or modifying) at least some of the plurality of characterization information portions of the first environment characterization vector 433. In some implementations, the perturbation engine 434 perturbs (or modifies) at least some of the plurality of characterization information portions of the first environment characterization vector 433 based on a random, pseudo-random, deterministic, procedural, and/or a like process. In some implementations, the perturbation engine 434 accepts user inputs, such as from a content developer, as perturbations to be applied onto the first environmental characterization vector 433.

In some implementations, perturbing at least some of the plurality of environmental characterization information portions includes adding, removing, or modifying at least some objects within the first set of objects. As one example, if the subject object or obstacle corresponds to a tree, the perturbation engine 434 may add, remove, etc. branches, leaves, and/or the like of the tree. As another example, if the subject object or obstacle corresponds to a tree, the perturbation engine 434 may change the size, shape, etc. of the branches, leaves, and/or the like of the tree.

In some implementations, perturbing at least some of the plurality of environmental characterization information portions includes modifying at least some environmental conditions associated with the first set of environmental conditions. For example, the perturbation engine 434 may change the wind speed, lighting conditions, temperature, barometric pressure, humidity, precipitation, and/or the like associated with the environment.

As one example, FIG. 5A illustrates an initial state of the environment 510A and a modified state of the environment 510B. For example, the initial state of the environment 510A corresponds to an image or portion of the source content 415, and the modified state of the environment 510B corresponds to a perturbed or artificially modified version of the initial state of the environment 510A. In the modified state of the environment 510B, the modified representation of the date palm 524B includes more fronds—ten in total as compared to five fronds. As such, in this example, the representation of the entity 522B modifies its trajectory or path to gather food (e.g., dates) from the modified representation of the date palm 524B.

As another example, FIG. 5B illustrates an initial state of the environment 540A and a modified state of the environment 540B. For example, the initial state of the environment 540A corresponds to an image or portion of the source content 415, and the modified state of the environment 540B corresponds to a perturbed or artificially modified version of the initial state of the environment 540A. In the modified state of the environment 514B, the modified representation of the wall 554B includes two additional parallel wings extending along an x-axis. As such, in this example, the representation of the entity 552B modifies its trajectory or path when locomoting around the modified representation of the wall 554B to pick up the object 556.

As represented by block 7-5, the method 700 includes generating a second set of behavioral trajectories associated with one or more potential actions of the entity based on the source content and the second characterization vector for the environment. With reference to FIG. 4A, the training architecture 400 or a component thereof (e.g., the trajectory generator 440B) generates generate a second set of behavioral trajectories 444 associated with one or more potential actions of the entity based on the initial behavior model 424A and the second characterization vector for the environment 435. In some implementations, each of the second set of behavioral trajectories correspond to PMPs.

As represented by block 7-6, the method 700 includes training a behavior model for a virtual agent based on the first and second sets of behavioral trajectories in order to imitate the entity. With reference to FIG. 4A, the training architecture 400 or a component thereof (e.g., the ML system 450) generates a trained behavior model 451A based on the first set of behavioral trajectories 442 and the second set of behavioral trajectories 444. In some implementations, the ML system 450 corresponds to an NN, a CNN, a DNN, a RNN, an SVM, an RVM, a random forest algorithm, or the like. With continued reference to FIG. 4A, the reward estimator 452 generates a reward signal 453 (e.g., a confidence or quality score) for the trained behavior model 451A and sends the reward signal 453 to the adjustor 454. As shown in FIG. 4A, the adjustor 454 adjusts one or more operating parameters 455 (e.g., filter weights, neurons, etc.) of the ML system 450 in accordance with a determination that the reward signal 453 fails to satisfy a threshold convergence metric. As shown in FIG. 4A, the adjustor 454 forgoes adjusting the one or more operating parameters 455 of the ML system 450 in accordance with a determination that the reward signal 453 satisfies the threshold convergence metric. As shown in FIG. 4A, the training architecture 400 stores the trained behavior model 451A in the entry associated with the entity within the VA library 430 when the reward signal 453 satisfies the threshold convergence metric.

As represented by block 7-7, the method 700 includes presenting, via the display device, the virtual agent performing one or more actions based on the trained behavior model. With reference to FIG. 6, the runtime architecture 600 or a component thereof (e.g., the content selector 612) obtains (e.g., receives, retrieves, etc.) a virtual agent from the VA library 430 based on one or more user inputs 601 (e.g., selecting the virtual agent from a menu of virtual agents). With continued reference to FIG. 6, the runtime architecture 600 or a component thereof (e.g., the animation engine 620) generates an animation 621 including the VA performing one or more actions based on the 3 D model 431A and the trained behavior model 451A.

Continuing with this example, the runtime architecture 600 or a component thereof (e.g., the pose determiner 652) determines a current camera pose of the electronic device 120 and/or the user 150 relative to an origin location for the virtual agent. Continuing with this example, the runtime architecture 600 or a component thereof (e.g., the renderer 654) renders the XR environment including the animation of the VA according to the current camera pose relative thereto. According to some implementations, the pose determiner 652 updates the current camera pose in response to detecting translational and/or rotational movement of the electronic device 120 and/or the user 150. Continuing with this example, in video pass-through scenarios, the runtime architecture 600 or a component thereof (e.g., the compositor 664) obtains (e.g., receives, retrieves, etc.) one or more images of the physical environment 105 captured by the image capture device 370 and composites the XR environment including the animation of virtual agent with the one or more images of the physical environment 105 to produce one or more rendered image frames. Finally, the runtime architecture 600 or a component thereof (e.g., the presenter 670) presents or causes presentation of the one or more rendered image frames (e.g., via the one or more displays 312 or the like). One of ordinary skill in the art will appreciate that the operations of the optional compositor 664 may not be applicable for fully virtual environments or optical see-through scenarios.

In some implementations, the display device corresponds to a transparent lens assembly, and wherein the virtual agent is projected onto the transparent lens assembly. In some implementations, the display device corresponds to a near-eye system, and wherein presenting the virtual agent includes compositing the virtual agent with one or more images of a physical environment captured by an exterior-facing image sensor.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a computing system including non-transitory memory and one or more processors, wherein the computing system is communicatively coupled to a display device and one or more input devices:
        obtaining source content that includes an entity performing one or more actions within an environment;
        generating a first environment characterization vector including a plurality of characterization information portions characterizing the environment;
        generating a first set of behavioral trajectories associated with the one or more actions of the entity based on the source content and the first characterization vector for the environment;
        generating a second environment characterization vector for the environment by perturbing at least some of the plurality of characterization information portions;
        generating a second set of behavioral trajectories associated with one or more potential actions of the entity based on the source content and the second characterization vector for the environment; and
        training a behavior model for a virtual agent based on the first and second sets of behavioral trajectories in order to imitate the entity.

2. The method of claim 1, wherein the characterization information portions include at least one of information characterizing a first set of objects within the environment or information characterizing a first set of environmental conditions.

3. The method of claim 2, wherein perturbing at least some of the plurality of environmental characterization information portions includes adding, removing, or modifying at least some objects within the first set of objects.

4. The method of claim 2, wherein perturbing at least some of the plurality of environmental characterization information portions includes modifying at least some environmental conditions associated with the first set of environmental conditions.

5. The method of claim 1, wherein each of the first set of behavioral trajectories correspond to physical motion plans.

6. The method of claim 1, wherein the source content corresponds to one of a live image stream, a locally captured image stream, a remotely captured image stream, a movie, or a TV episode.

7. The method of claim 1, wherein generating the first characterization vector includes performing one of image segmentation or instance segmentation on the source content.

8. The method of claim 1, wherein the entity corresponds to a humanoid or an animal.

9. The method of claim 1, further comprising:
    generating a three-dimensional (3 D) model associated with the entity based on the source content, wherein the virtual agent corresponds to the 3D model.

10. The method of claim 1, further comprising:
    generating an initial behavior model for the entity based on the source content, wherein the first set of behavioral trajectories are generated based on the initial behavior model and the first environment characterization vector, and wherein the second set of behavioral trajectories are generated based on the initial behavior model and the second environment characterization vector.

11. The method of claim 10, wherein training the behavior model for the virtual agent corresponds to updating the initial behavior model based on the first and second sets of behavioral trajectories.

12. The method of claim 1, further comprising:
    presenting, via the display device, the virtual agent performing one or more actions based on the trained behavior model.

13. A device comprising:
    one or more processors;
    a non-transitory memory;

an interface for communicating with a display device and one or more input devices; and one or more programs stored in the non-transitory memory, which, when executed by the one or more processors, cause the device to:
obtain source content that includes an entity performing one or more actions within an environment;
generate a first environment characterization vector including a plurality of characterization information portions characterizing the environment;
generate a first set of behavioral trajectories associated with the one or more actions of the entity based on the source content and the first characterization vector for the environment;
generate a second environment characterization vector for the environment by perturbing at least some of the plurality of characterization information portions;
generate a second set of behavioral trajectories associated with one or more potential actions of the entity based on the source content and the second characterization vector for the environment; and
train a behavior model for a virtual agent based on the first and second sets of behavioral trajectories in order to imitate the entity.

14. The device of claim 13, wherein the one or more programs further cause the device to:
generate an initial behavior model for the entity based on the source content, wherein the first set of behavioral trajectories are generated based on the initial behavior model and the first environment characterization vector, and wherein the second set of behavioral trajectories are generated based on the initial behavior model and the second environment characterization vector.

15. The device of claim 14, wherein training the behavior model for the virtual agent corresponds to updating the initial behavior model based on the first and second sets of behavioral trajectories.

16. The device of claim 13, wherein the characterization information portions include at least one of information characterizing a first set of objects within the environment or information characterizing a first set of environmental conditions.

17. The device of claim 16, wherein perturbing at least some of the plurality of environmental characterization information portions includes adding, removing, or modifying at least some objects within the first set of objects.

18. The device of claim 16, wherein perturbing at least some of the plurality of environmental characterization information portions includes modifying at least some environmental conditions associated with the first set of environmental conditions.

19. A non-transitory memory storing one or more programs, which, when executed by one or more processors of a device with an interface for communicating with a display device and one or more input devices, cause the device to:
obtain source content that includes an entity performing one or more actions within an environment;
generate a first environment characterization vector including a plurality of characterization information portions characterizing the environment;
generate a first set of behavioral trajectories associated with the one or more actions of the entity based on the source content and the first characterization vector for the environment;
generate a second environment characterization vector for the environment by perturbing at least some of the plurality of characterization information portions;
generate a second set of behavioral trajectories associated with one or more potential actions of the entity based on the source content and the second characterization vector for the environment; and
train a behavior model for a virtual agent based on the first and second sets of behavioral trajectories in order to imitate the entity.

20. The non-transitory memory of claim 19, wherein the one or more programs further cause the device to:
generate an initial behavior model for the entity based on the source content, wherein the first set of behavioral trajectories are generated based on the initial behavior model and the first environment characterization vector, and wherein the second set of behavioral trajectories are generated based on the initial behavior model and the second environment characterization vector.

21. The non-transitory memory of claim 20, wherein training the behavior model for the virtual agent corresponds to updating the initial behavior model based on the first and second sets of behavioral trajectories.

22. The non-transitory memory of claim 19, wherein the characterization information portions include at least one of information characterizing a first set of objects within the environment or information characterizing a first set of environmental conditions.

23. The non-transitory memory of claim 22, wherein perturbing at least some of the plurality of environmental characterization information portions includes adding, removing, or modifying at least some objects within the first set of objects.

24. The non-transitory memory of claim 22, wherein perturbing at least some of the plurality of environmental characterization information portions includes modifying at least some environmental conditions associated with the first set of environmental conditions.

* * * * *